United States Patent
Chen et al.

(10) Patent No.: US 9,262,662 B2
(45) Date of Patent: Feb. 16, 2016

(54) OPTICAL READING APPARATUS HAVING VARIABLE SETTINGS

(75) Inventors: Xin Chen, Jiangsu (CN); Jun Yin, JiangSu (CN)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 14/416,147

(22) PCT Filed: Jul. 31, 2012

(86) PCT No.: PCT/CN2012/079398
§ 371 (c)(1),
(2), (4) Date: Jan. 21, 2015

(87) PCT Pub. No.: WO2014/019130
PCT Pub. Date: Feb. 6, 2014

(65) Prior Publication Data
US 2015/0186703 A1     Jul. 2, 2015

(51) Int. Cl.
*G06K 19/00* (2006.01)
*G06K 7/10* (2006.01)

(52) U.S. Cl.
CPC ........ *G06K 7/10811* (2013.01); *G06K 7/10564* (2013.01); *G06K 7/10584* (2013.01); *G06K 7/10633* (2013.01)

(58) Field of Classification Search
USPC .................................. 235/435, 439, 454, 462
See application file for complete search history.

(56) References Cited

U.S. PATENT DOCUMENTS

| | | | |
|---|---|---|---|
| 5,479,011 A * | 12/1995 | Rudeen et al. | 250/235 |
| 2005/0218231 A1* | 10/2005 | Massieu | 235/472.01 |
| 2008/0230611 A1* | 9/2008 | Sprague et al. | 235/462.22 |

* cited by examiner

*Primary Examiner* — Matthew Mikels
(74) *Attorney, Agent, or Firm* — Additon, Higgins & Pendleton, P.A.

(57) ABSTRACT

A laser scanning indicia reading apparatus (1000) comprises one or more adjustable aperture assemblies (2024) for adjusting the diameter of a laser beam and adjustable lens assemblies (2026) for adjusting the distance of a laser beam waist (W).

13 Claims, 5 Drawing Sheets

OPTICAL READING APPARATUS HAVING VARIABLE SETTINGS

FIELD OF THE INVENTION

The present invention relates in general to optical systems and specifically to optical systems having optical characteristics that can be varied.

BACKGROUND OF THE INVENTION

Indicia reading apparatus for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatus having keyboards and displays are also available. Keyboards and display equipped indicia reading apparatus are commonly used in shipping and warehouse applications, and are available in form factors incorporating a display and keyboard. In a keyboard and display equipped indicia reading apparatus, a trigger button for actuating the output of decoded messages is typically provided in such locations as to enable actuation by a thumb of an operator. Indicia reading apparatus in a form devoid of a keyboard and display or in a keyboard and display equipped form are commonly used in a variety of data collection applications including point of sale applications, shipping applications, warehousing applications, security check point applications, and patient care applications.

Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters. Some indicia reading apparatuses include image sensor based image data output systems while other indicia reading apparatuses include laser scanning based image data output system.

SUMMARY OF THE INVENTION

There is set forth herein a laser scanning indicia reading apparatus having one or more of an adjustable aperture assembly for adjusting a diameter of a laser beam and an adjustable lens assembly for adjusting a distance of a laser beam waist.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

There is set forth herein a laser scanning indicia reading apparatus having one or more of an adjustable aperture assembly for adjusting a diameter of a laser beam and an adjustable lens assembly for adjusting a distance of a laser beam waist.

In one embodiment the apparatus can have a first configuration and a second configuration. With the first configuration active the adjustable aperture assembly can have a first aperture assembly setting and the lens assembly can have a first best focus distance setting. With the second configuration active the adjustable aperture assembly can have a second aperture assembly setting and a second best focus distance setting. The second aperture assembly setting can be a larger diameter aperture assembly setting than the first aperture assembly setting. The second best focus distance setting can be longer than the first best focus distance setting.

In the development of apparatus 1000 it was determined that indicia reading apparatus having optimized depths of field when reading higher density decodable indicia often do not have optimized depths of field when reading lower density decodable indicia and that indicia reading apparatus having optimized depths of field when reading lower density decodable indicia often do not have optimized depth of fields when reading higher density decodable indicia. There is set forth herein an indicia reading apparatus having optimized depths of field (DOF) when reading of both higher density and lower density decodable indicia.

Figure 1:
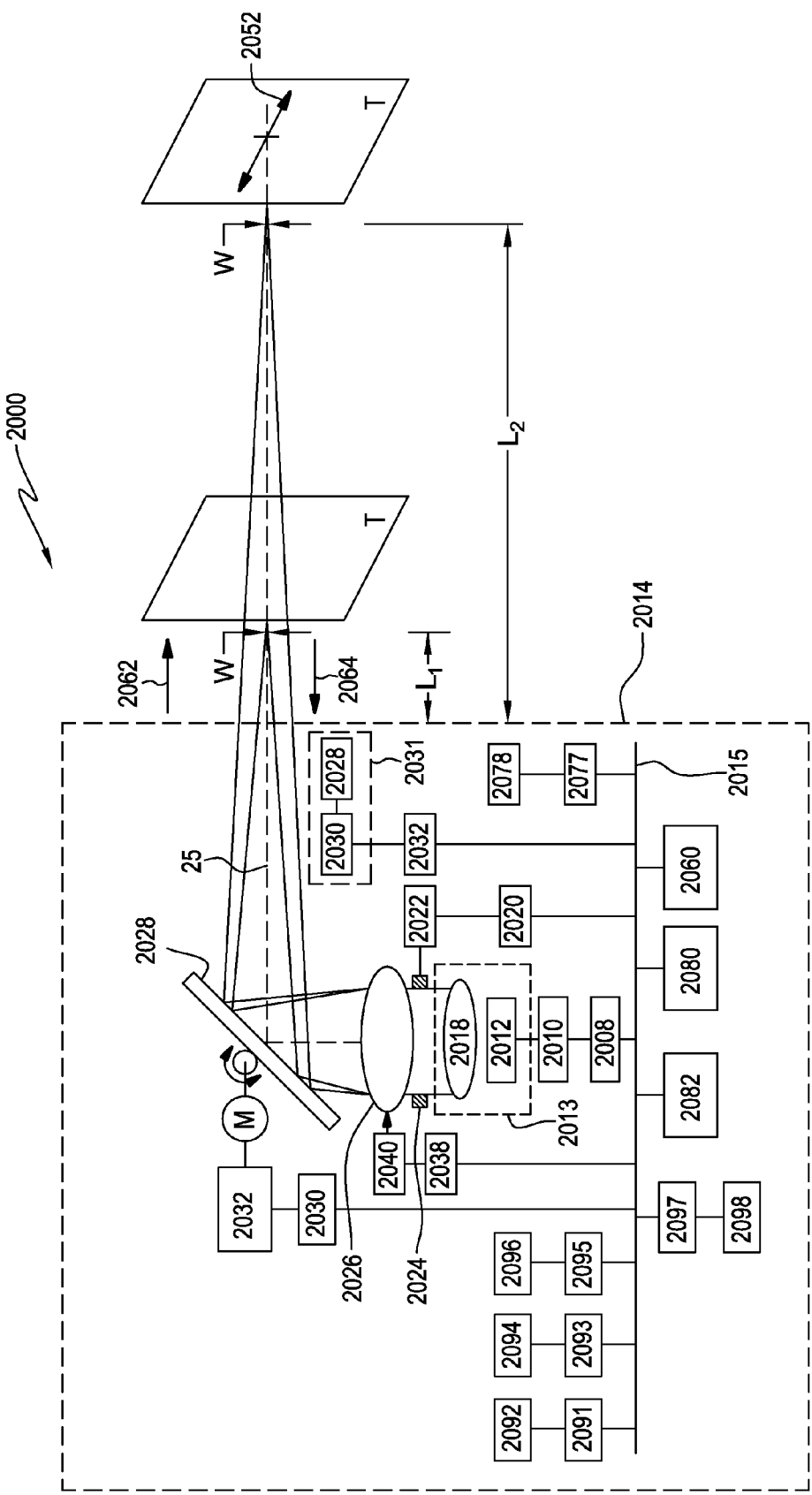
FIG. 1 is a block diagram of a laser scanning indicia reading apparatus.

An exemplary hardware platform for apparatus 1000 is shown in FIG. 1. Apparatus 1000 can include a laser source 2012 supported by a hand held housing 2014. The laser source 2012 can emit a laser beam along an optical path, or axis 25. Laser source 2012 can be coupled to laser source control circuit 2010. Light from laser source 2012 can be shaped by collimating optics 2018 adjustable aperture assembly 2024 and lens assembly 2026. The combination of laser source 2012 and collimating optics 2014 can be regarded as a laser diode assembly 2016. The laser beam travels in an emitting direction 2002 along axis 25 and illuminates a target substrate T (target), which in one embodiment can include a decodable indicia 15. In the embodiment of FIG. 1, decodable indicia 15 can be provided by a bar code symbol. A scanning mirror reflector 2028 disposed within the optical path defined by axis 25 oscillates to direct the laser beam in a forward direction 2062 across a surface to be scanned. Scanning mirror reflector 2028 scans a laser beam along a target substrate T in a specified manner to define scan pattern 2052. Reflector 2028 can be driven by scan motor, M, which is coupled to control circuit 2032.

The laser beam reflects off the target T and travels along axis 25 in a receiving direction 2064 back to a detector 2028. In the example wherein the target T includes a barcode, the incident laser light strikes areas of dark and white bands and is reflected. The reflected beam will thusly have variable intensity representative of the barcode pattern. Detector 2028 can output analog signal image data representing reflected laser light to amplifier 2030 which can amplify the analog signal image data and output amplified analog signal image data to analog to digital converter 2032, which can convert the amplified analog signal image data into digitized image data. Analog to digital converter 2032 can output digitized image data to random access memory (RAM) 2080 via system bus 2015, to facilitate processing of the image data by CPU 2060.

CPU 2060 can process image data in accordance with a program stored in non-volatile memory 2082, provided in a particular example by an EPROM.

For attempting to decode a bar code symbol, CPU 2060 can process digitized image data representing a scanned, reflected, and detected laser beam to determine a spatial pattern of dark cells and light cells and can convert each light and dark cell pattern determined into a character of character string via table lookup.

Apparatus 1000 can include various interface circuits (interfaces) coupled to system bus 2015 allowing CPU 2060 to communicate with various circuits of apparatus 1000 including interface 2008 coupled to laser light control circuit 2010 and interface 2030 coupled to motor control circuit 2032, and interface 2038 coupled to lens assembly electrical power input unit 2040. Apparatus 1000 can also include trigger 2082 which can be actuated to initiate a decode attempt. Manual trigger 2092 can be coupled to interface 2091, which in turn can be coupled to system bus 2015. Apparatus 1000 can also include a display 2094 in communication with CPU 2060 via interface 2093 as well as pointer mechanism 2096 in communication with CPU 2060 via interface 2095 coupled to system bus 2015. Apparatus 1000 can include a range detector 2078 coupled to system bus 2015 via interface 2077. In one embodiment, range detector 2078 can be an ultrasonic range detector.

Referring to further aspects of apparatus 1000, apparatus 1000 can include adjustable aperture assembly 2024 disposed to shape laser light propagating along optical path 25. In one embodiment, aperture assembly 2024 can be disposed in an optical path optically forward of laser diode assembly 2016 and can shape light for input into lens assembly 2026. Aperture assembly 2024 can be controlled with use of a control circuit 2022 coupled to system bus 2015 via interface 2020.

Referring to further aspects of indicia reading apparatus 1000, apparatus 1000 can include electrical power input unit 2040 for inputting of energy for changing an optical characteristic (e.g., focal length, plane of optimal focus) of lens assembly 2026. In one embodiment, an energy input to lens assembly 2026 can be varied to vary a plane of optimum focus of a laser beam that is shaped by optics 2018, 2026, 2028. A plane (or distance) of optimum focus of a projected laser beam can be varied between a first distance L1 of optimum focus and a second distance L2 of optimum focus.

When a best focus setting of lens assembly 2026 is set to distance L=L1, a waist W of an emitted laser beam along path 25 will be defined at a distance L=L1. When a best focus setting of lens assembly 2026 is set to distance L=L2, a waist W of an emitted laser beam will be defined at distance L=L2, and apparatus 1000 will be optimized for reading a target T at distance L2.

Figure 2:
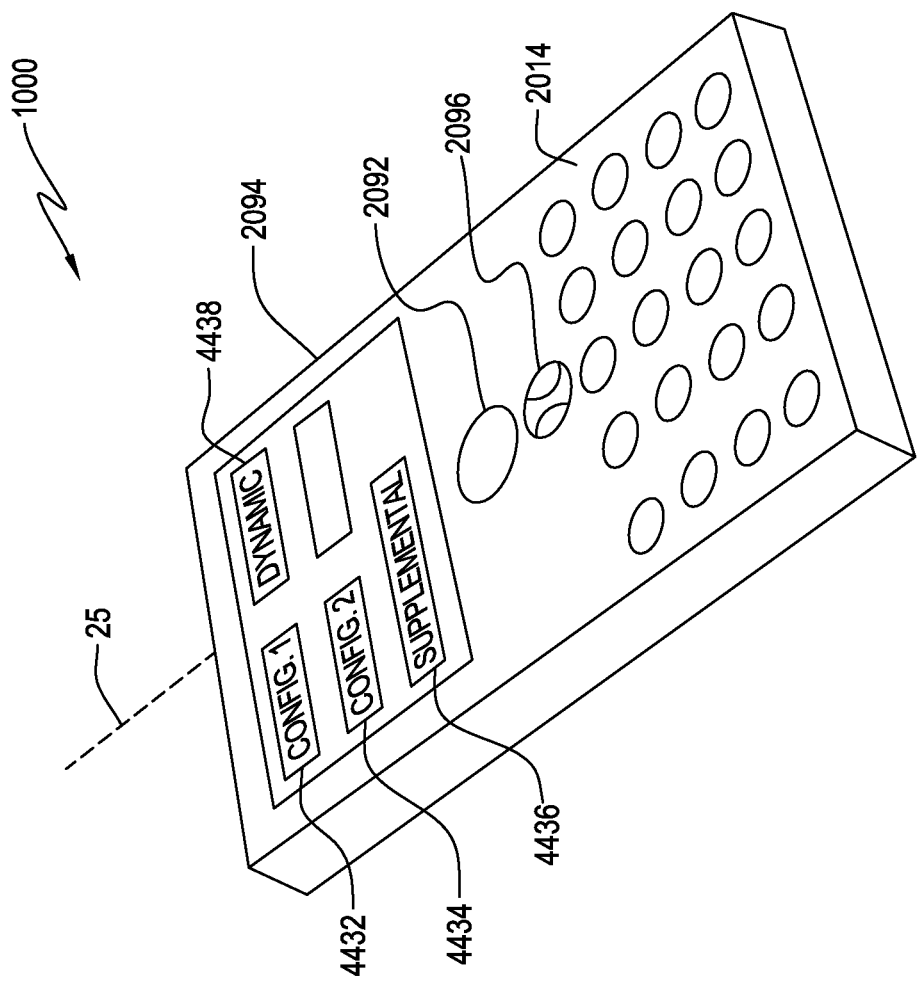
FIG. 2 is a physical form view of an indicia reading apparatus.

A physical form view of a laser scanning based indicia reading apparatus 1000 is shown in FIG. 2. Apparatus 1000 can include display 2094 and trigger 2092 and pointer mechanism 2096 disposed on a common side of hand held housing 2014. A user interface of apparatus 1000 can be provided by display 2094 and trigger 2092 and pointer mechanism 2096 in combination. In one embodiment, display 2094 can be a touch screen display and a functionality of trigger 2092, display 2094, and pointer mechanism 2096 can be provided by display 2094. Trigger 2092 can be a virtual trigger in the case display 2094 is a touch screen display. A user interface of apparatus 1000 can also be provided, e.g., by configuring apparatus 1000 to be operative to be programmed by decoding of programming bar code symbols. In another embodiment, hand held housing 2014 can be devoid of a display and can include a gun style form factor.

In one embodiment a user can select configurations of apparatus 1000 with use of a user interface of apparatus e.g., by selection of a displayed button 4432, 4434, 4436, 4438 as shown in FIG. 2. In one embodiment, with the first configuration selected apparatus 1000 can be operative so that the first configuration is active for a duration of trigger signal activation period as will be set forth herein. In one embodiment with the second configuration selected e.g., using button 4434 apparatus 1000 can be operative so that the second configuration is active for a duration of a trigger signal activation period.

In one embodiment apparatus 1000 can include a supplementary configuration. The supplementary configuration can be selected with use of button 4436 as shown in FIG. 2. With the supplementary configuration active, an aperture assembly setting of adjustable aperture assembly 2024 can be set to a setting intermediate the first aperture assembly setting and the second aperture assembly setting and further with the supplementary configuration, a best focus distance setting of lens assembly 2026 can be set to intermediate a first best focus distance setting and a second best focus distance setting.

Apparatus 1000 in one embodiment can be operative so that with the first configuration second configuration or supplementary configuration selected, a selected configuration remains active for a duration of a trigger signal activation period.

In one embodiment, apparatus 1000 can include a dynamic configuration. With a dynamic configuration selected e.g., with use of button 4438, apparatus 1000 can be operative so that a two or more of the first configuration the second configuration and supplementary configuration can be active during a trigger signal activation period.

Figure 3:
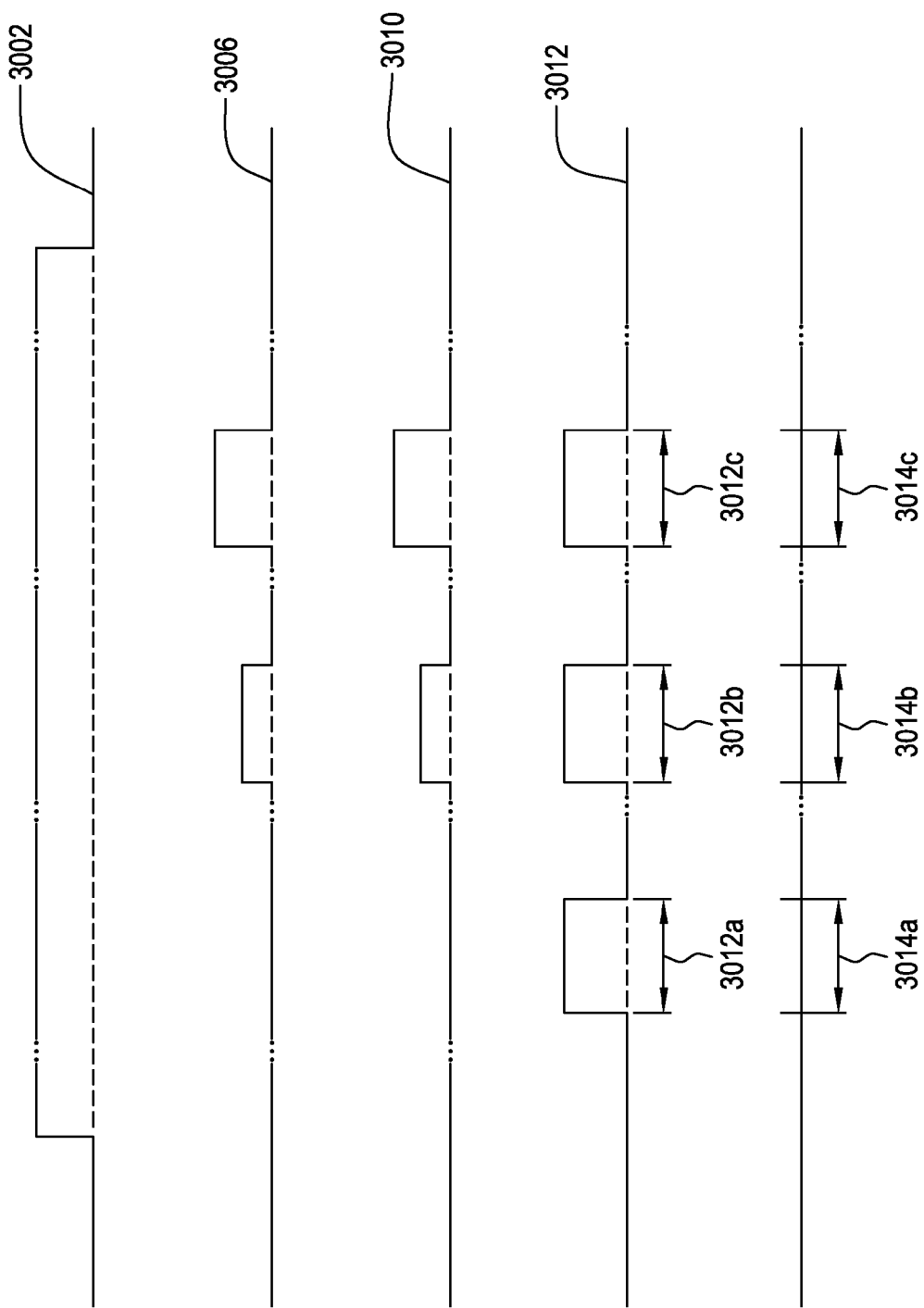
FIG. 3 is a timing diagram illustrating operation of an indicia reading apparatus.

A timing diagram illustrating exemplary operation of apparatus 1000 with the dynamic configuration active is shown in FIG. 3. Referring to timing diagram of FIG. 3, signal 3002 is trigger signal that can be made active using manual trigger 2092. Logic high periods of signal 3002 are trigger signal activation periods and logic low periods are trigger signal inactive periods. Apparatus 1000 can be operative so that a trigger signal 3002 is made active by depression of trigger 2092 and further so that trigger signal 3002 is deactivated by one or more of releasing trigger 2092, a successful decode or an expiration of a timeout.

Referring to signal 3006, signal 3006 is signal controlling a state of adjustable aperture assembly 2024. Signal 3006 can be switchable between a first level (level 0) in which the first aperture assembly setting is active, a second level (level 1) in which the second aperture assembly setting is active and level intermediate between the first and second level in which an aperture assembly setting between the first and second aperture assembly setting is active.

Referring to signal 3010, signal 3010 is signal controlling a best focus distance setting of lens assembly 2026. Signal 3010 can be switchable between a first level (level 0) in which the first best focus setting is active, a second level (level 1) in which the second best focus distance setting is active and level intermediate between the first and second level in which an aperture assembly setting between the first and second aperture assembly setting is active.

Referring to signal 3012, signal 3012 is a signal controlling scanning of an emitted laser beam along target T to define scan pattern 2052.

Referring to periods 3012*a*, 3012*b*, 3012*c*, periods 3012*a*, 3012*b*, 3012*c*, are periods during which a projected laser beam is scanned across scan pattern 2052 and further during which image data representing reflected laser light reflected from target T can be output by photodetector 2028 amplifier 2030 and converter 2032 for processing by CPU 2060.

Referring to periods 3014a, 3014b, 3014c periods 3014a, 3014b, 3014c are periods during which apparatus 1000 can attempt to decode decodable indicia by processing of image data representative of reflected laser light. During periods 3014a, 3014b, 3014c, in one embodiment CPU 2060 can attempt to decode decodable indicia by processing of digitized image data output by analog to digital converter 2020 and stored in RAM 2080 for processing by CPU 2060. During periods 3014a, 3014b, 3014c, in one embodiment apparatus 1000 can attempt to decode by processing, via an analog signal processing circuit that processes amplified analog signal image data output by amplifier 2030.

Referring to the timing diagram of FIG. 3 it is seen that indicia reading apparatus 1000 can be operative in each of a first configuration and second configuration and a supplementary configuration during a trigger signal activation periods. A transition between configurations can be on an open loop basis or alternatively can be responsive to a sensed condition (on a closed loop based). In one embodiment the sensed condition can be a detected distance of apparatus 1000 to a target substrate T. The target substrate T can be detected using range detector during the certain trigger signal activation period. Apparatus 1000 can be operative so that is a distance below a low threshold is detected during a certain trigger signal activation period the first configuration can be made active and further so that if a distance longer than a high threshold is detected the second configuration can be made active.

Figure 6:
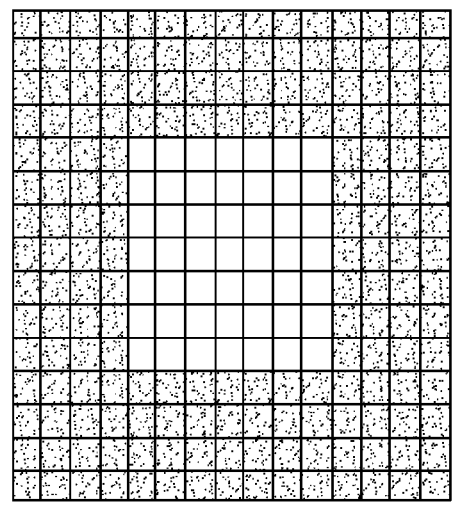
FIGS. 4, 5 and 6 are diagrams illustrating operation of a liquid crystal display aperture assembly.
Figure 5:
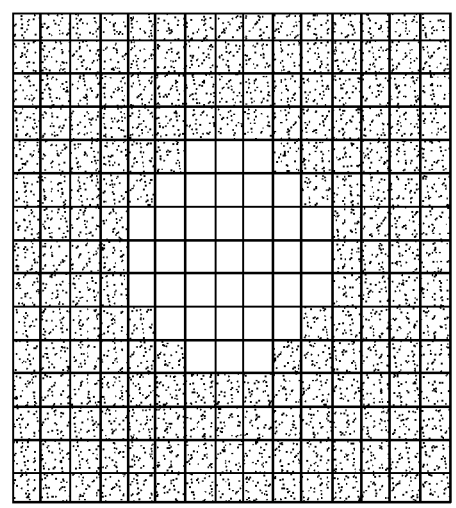
Figure 4:
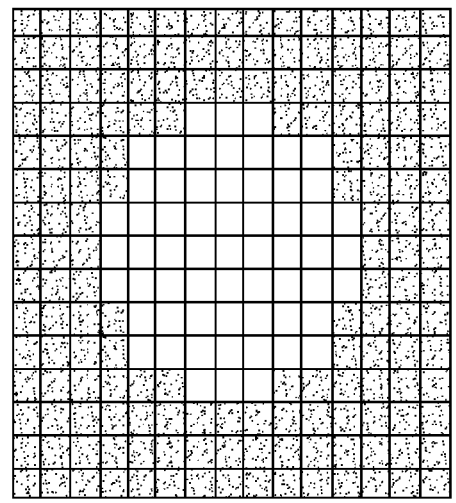

Referring now to further aspects of apparatus 1000, adjustable aperture assembly 2024 can be provided in one embodiment by a liquid crystal display (LCD) aperture assembly. In another embodiment, adjustable aperture assembly 2024 is another type of electronic aperture assembly. Aperture assembly 2024 can include a plurality of cells. Control circuit 2022 can change a voltage applied to aperture assembly 2024 to change an opacity of select cells of aperture assembly 2024. Opaque cells of aperture assembly 2024 block light. A diagram illustrating operation of a liquid crystal display aperture assembly 2024 is shown in FIGS. 4, 5 and 6. A liquid crystal display aperture assembly 2024 can include a plurality of cells which can be controlled to be one of light transmissive or opaque. Size of a defined aperture can be adjusted, as seen by comparison between FIGS. 4 and 5. A shape of an aperture can also be adjusted as is indicated by a comparison between the states indicated by FIGS. 5 and 6, respectively. In one embodiment, aperture assembly 2024 can comprise a programmable liquid crystal display of the type incorporated in an S800 smartphone of the type available from LENOVO.

Figure 7:
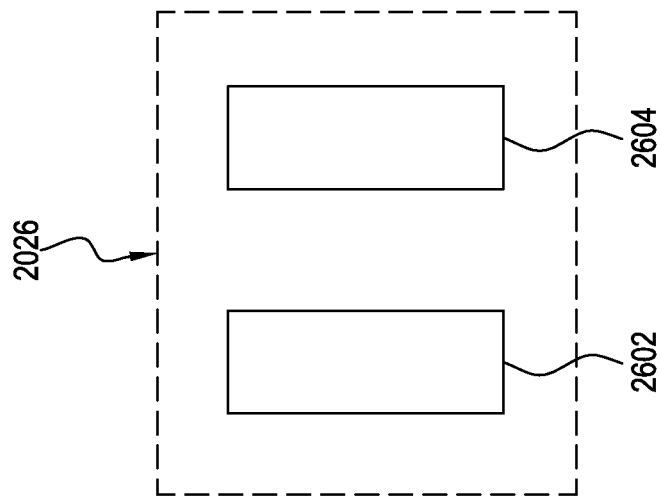
FIGS. 7 and 8 illustrate examples of lens assemblies for use with an indicia reading apparatus.
Figure 8:
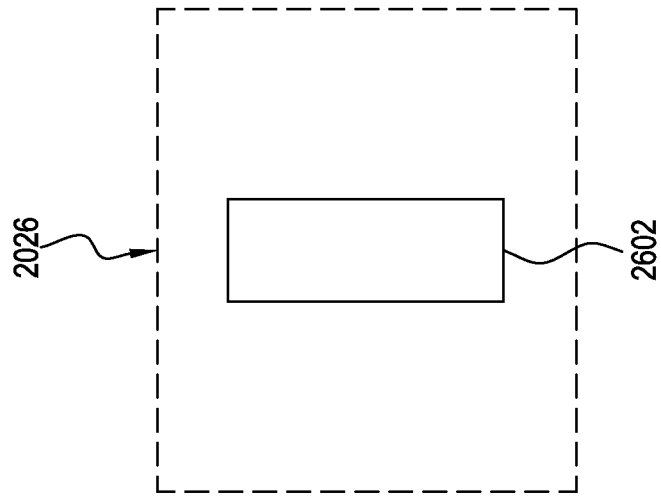

Regarding lens assembly 2026, lens assembly 2026 in the embodiment as shown in FIG. 7 can include a liquid lens 2602 with one or more additional liquid or non-liquid (e.g., glass, polycarbonate) lenses 2604. Lens assembly 2026 in the embodiment as shown in FIG. 8 can consist of liquid lens 2602. Liquid lens 2602 can comprise e.g., an electrowetting liquid lens, or a fluid deformable liquid lens. In one example, liquid lens 2602 can be provided by an ARCTIC 316 liquid lens of the type available from VARIOPTIC.

A small sample of systems methods and apparatus that are described herein is as follows:

A1. An indicia reading apparatus comprising: a housing; a laser diode assembly; a scanning mechanism for scanning a laser beam in a scan pattern across a target substrate; an adjustable aperture assembly for adjusting a beam diameter of emitted laser light; a lens assembly for adjusting a waist distance of a laser beam canned by the scanning mechanism; wherein the indicia reading apparatus is operative to output image data representing reflected light; wherein the indicia reading apparatus is operative to process image data output by the indicia reading apparatus for attempting to decode decodable indicia; a first configuration in which the adjustable aperture assembly is set to a first aperture assembly setting and the lens assembly is set to a first best focus distance setting; a second configuration in which the adjustable aperture assembly is set to a second aperture assembly setting and the lens assembly is set to a second best focus distance setting, the second aperture assembly setting being a larger diameter aperture assembly setting than the first aperture assembly setting, and wherein the second best focus distance setting is a best focus distance setting longer than the first best focus distance setting; wherein the indicia reading apparatus is operative to output first image data representing reflected laser light reflected from a target substrate with the first configuration active and is further operative to output second image data representing reflected light reflected from the target substrate with the second configuration active; wherein the apparatus is operative to attempt to decode decodable indicia utilizing the first image data and the second image data. A2. The indicia reading apparatus of claim A1, wherein the apparatus is adapted so that the first configuration can be selected responsively to a user input control and further so that the first configuration remains active for a duration of a trigger signal activation period of the apparatus. A3. The indicia reading apparatus of claim A1, wherein the apparatus is adapted so that each of the first configuration and second configuration are active during a trigger signal activation period. A4. The indicia reading apparatus of claim A3, wherein the apparatus is adapted so that the indicia reading apparatus changes between at least the first configuration and the second configuration on an open loop basis during a trigger signal activation period. A5. The indicia reading apparatus of claim A3, wherein the apparatus is adapted so that the indicia reading apparatus changes between at least the first configuration and the second configuration on a closed loop basis during a trigger signal activation period. A6. The indicia reading apparatus of claim A3, wherein the apparatus is adapted so that the indicia reading apparatus changes between at least the first configuration and the second configuration on a closed loop basis responsively to a detected apparatus to target substrate distance during a trigger signal activation period. A7. The indicia reading apparatus of claim A1, wherein the apparatus includes a supplementary configuration in which the aperture assembly setting is set to a setting intermediate the first and second aperture assembly setting and the lens setting is set to a best focus distance between the first and second best focus distance. A8. The indicia reading apparatus of claim A7, wherein the apparatus is adapted so that the supplementary configuration can be selected responsively to a user input control and further so that the supplementary configuration remains active for a duration of a trigger signal activation period of the apparatus. A9. The indicia reading apparatus of claim A7, wherein apparatus is adapted so that each of the first configuration, the supplementary configuration and the second configuration are active during a trigger signal activation period. A10. The indicia reading apparatus of claim A1, wherein the adjustable aperture assembly is an electronic aperture assembly. A11. The indicia reading apparatus of claim A1, wherein the adjustable aperture assembly is a liquid crystal display (LCD) electronic aperture assembly. A12. The indicia reading apparatus of claim A1, wherein the lens assembly includes a fluid lens. A13. The indicia reading apparatus of claim A12, wherein the fluid lens is an electro-wetting fluid lens.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

We claim:

1. An indicia reading apparatus comprising:
   a housing;
   a laser diode assembly;
   a scanning mechanism for scanning a laser beam in a scan pattern across a target substrate;
   a lens assembly for adjusting a waist distance of a laser beam canned by the scanning mechanism;
   an adjustable aperture assembly positioned between the laser diode assembly and the lens assembly, the adjustable aperture assembly adjusting a beam diameter of emitted laser light;
   wherein the indicia reading apparatus is operative to output image data representing reflected light; wherein the indicia reading apparatus is operative to process image data output by the indicia reading apparatus for attempting to decode decodable indicia;
   a first configuration in which the adjustable aperture assembly is set to a first aperture assembly setting and the lens assembly is set to a first best focus distance setting;
   a second configuration in which the adjustable aperture assembly is set to a second aperture assembly setting and the lens assembly is set to a second best focus distance setting, the second aperture assembly setting being a larger diameter aperture assembly setting than the first aperture assembly setting, and wherein the second best focus distance setting is a best focus distance setting longer than the first best focus distance setting;
   wherein the indicia reading apparatus is operative to output first image data representing reflected laser light reflected from a target substrate with the first configuration active and is further operative to output second image data representing reflected light reflected from the target substrate with the second configuration active;
   wherein the apparatus is operative to attempt to decode decodable indicia utilizing the first image data and the second image data.

2. The indicia reading apparatus of claim 1, wherein the apparatus is adapted so that the first configuration can be selected responsively to a user input control and further so that the first configuration remains active for a duration of a trigger signal activation period of the apparatus.

3. The indicia reading apparatus of claim 1, wherein the apparatus is adapted so that each of the first configuration and second configuration are active during a trigger signal activation period.

4. The indicia reading apparatus of claim 3, wherein the apparatus is adapted so that the indicia reading apparatus changes between at least the first configuration and the second configuration on an open loop basis during a trigger signal activation period.

5. The indicia reading apparatus of claim 3, wherein the apparatus is adapted so that the indicia reading apparatus changes between at least the first configuration and the second configuration on a closed loop basis during a trigger signal activation period.

6. The indicia reading apparatus of claim 3, wherein the apparatus is adapted so that the indicia reading apparatus changes between at least the first configuration and the second configuration on a closed loop basis responsively to a detected apparatus to target substrate distance during a trigger signal activation period.

7. The indicia reading apparatus of claim 1, wherein the apparatus includes a supplementary configuration in which the aperture assembly setting is set to a setting intermediate the first and second aperture assembly setting and the lens setting is set to a best focus distance between the first and second best focus distance.

8. The indicia reading apparatus of claim 7, wherein the apparatus is adapted so that the supplementary configuration can be selected responsively to a user input control and further so that the supplementary configuration remains active for a duration of a trigger signal activation period of the apparatus.

9. The indicia reading apparatus of claim 7, wherein apparatus is adapted so that each of the first configuration, the supplementary configuration and the second configuration are active during a trigger signal activation period.

10. The indicia reading apparatus of claim 1, wherein the adjustable aperture assembly is an electronic aperture assembly.

11. The indicia reading apparatus of claim 1, wherein the adjustable aperture assembly is a liquid crystal display (LCD) electronic aperture assembly.

12. The indicia reading apparatus of claim 1, wherein the lens assembly includes a fluid lens.

13. The indicia reading apparatus of claim 12, wherein the fluid lens is an electro-wetting fluid lens.

* * * * *